J. D. HUSBANDS, Jr.
Fire-Kindlers.

No. 154,796. Patented Sept. 8, 1874.

Witnesses.
H. Kingsbury
Wm. M. Bennett

Inventor.
J. D. Husbands, Jr.
By Wm. S. Loughborough
Atty

UNITED STATES PATENT OFFICE.

JOSEPH D. HUSBANDS, JR., OF ST. LOUIS, MISSOURI.

IMPROVEMENT IN FIRE-KINDLERS.

Specification forming part of Letters Patent No. 154,796, dated September 8, 1874; application filed August 22, 1874.

*To all whom it may concern:*

Be it known that I, JOS. D. HUSBANDS, Jr., of St. Louis, in the county of St. Louis and State of Missouri, have invented a certain new and useful Fire-Kindler; and I do hereby declare that the following is a full, clear, and exact description thereof, reference being had to the accompanying drawings making part of this specification, in which—

Figure 1:
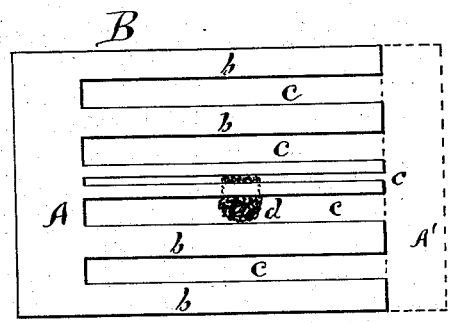
Figure 2:
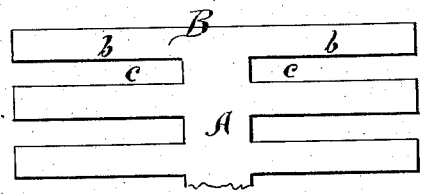
Figure 3:
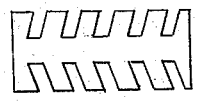
Figure 4:
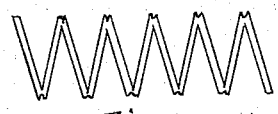

Figure 1 is an inverted plan view of my invention. Figs. 2, 3, and 4 show a modification of the same.

The object of my invention is to provide a cheap as well as efficient fire-kindler. Its nature consists more especially in the formation of a grated kindler from a single block or piece of wood, (or equivalent material,) and of convenient size, said grated blocks being afterward saturated or coated with any suitable inflammable material, such as petroleum, paraffine, or rosin, &c.

The lumber from which the grate-blocks are taken or formed may be prepared by sawing strips of suitable width and thickness from the slabs and other refuse pieces which accumulate in great quantities around lumber-mills. Said strips are then cut into rectangular blocks B, which are afterward fed over a gang of saws of a proper thickness to form the several interstices $c$ at one operation. There should be a sufficient depth of timber left at the head A to prevent the bars $b$ from being too easily split off while being dipped and packed. If desirable, the cross head or bar A may be formed in the center, as shown in Fig. 2; but I prefer the plan shown in Fig. 1. The torch or igniting-wick $d$ may be formed of fragments of gunny, burlap, cotton-waste, or equivalent material, and applied as shown; or a single length may be inserted between two bars, where it is secured by the rosin when the blocks are dipped. When rosin is used for the coating it should be heated quite hot, so as not to deposit too thick a coat upon the grates. The grates might be formed from peat or other inflammable material, or from a cheap composition, using sawdust as a base. The dotted lines at A' in Fig. 1 represent a kindler having a head formed at each end of the bars $b$. Fig. 4 represents straight strips partially broken into suitable lengths before being dipped.

What I claim as my invention is—

As an article of manufacture, the improved fire-kindler B, consisting of head A, the projecting arms or bars $b\ b$, with air-passages $c\ c$ between them, and the igniting-wick $d$, made in one piece and coated with some inflammable material, substantially as described.

JOSEPH D. HUSBANDS, JR.

Witnesses:
 WM. S. LOUGHBOROUGH,
 DANIEL WOOD.